United States Patent [19]

Toal et al.

[11] 4,094,550
[45] June 13, 1978

[54] VEHICLE WHEEL TRIM RING ASSEMBLY

[75] Inventors: Desmond J. Toal, Valdosta; John Matthew McKenzie, Lake Park, both of Ga.; Franklin Delano Hemby, Warren, Mich.

[73] Assignee: International Telephone and Telegraph Corporation, New York, N.Y.

[21] Appl. No.: 551,095

[22] Filed: Feb. 20, 1975

[51] Int. Cl.² .............................................. B60B 7/00
[52] U.S. Cl. ............................... 301/37 R; 29/159 A; 113/116 E
[58] Field of Search ................... 29/159 A, 50 A; 301/37 R, 37 C, 37 CD, 37 TP, 37 PB, 37 L, 37 B; 113/1 N, 116 D, 116 E

[56] References Cited

U.S. PATENT DOCUMENTS

| 1,958,484 | 5/1934 | Lyon | 301/37 B |
| 2,426,627 | 9/1947 | Lyon | 29/159 A |
| 2,522,230 | 9/1950 | Komulaine | 29/509 |
| 3,006,691 | 10/1961 | Lyon | 29/159 A |
| 3,020,040 | 2/1962 | Lyon | 301/37 TP |
| 3,145,058 | 8/1964 | Demrick et al. | 301/37 B |
| 3,168,349 | 2/1965 | Maletzke | 301/37 R |
| 3,252,213 | 5/1966 | Cuta | 29/509 |
| 3,532,385 | 10/1970 | Foster | 301/37 R |
| 3,746,398 | 7/1973 | Buerger | 301/37 R |

FOREIGN PATENT DOCUMENTS

| 769,622 | 10/1967 | Canada | 285/419 |
| 610,267 | 12/1960 | Canada | 301/37 B |

Primary Examiner—Robert B. Reeves
Assistant Examiner—H. Grant Skaggs
Attorney, Agent, or Firm—James B. Raden; William J. Michals

[57] ABSTRACT

A wheel trim ring assembly for a motor vehicle including a retaining ring having retaining fingers circularly disposed at the axially inner edge of the retaining ring for engaging a generally radially facing flange of the wheel. The axially and radially outer edge of the retaining ring is terminated in a reinforced edge or bead residing in the plane of the outer edge and formed from a single thickness of the material. The outer annular edge of the trim ring is rolled and clinched over the reinforced edge of the retaining ring and is provided with a plurality of circumferentially disposed indentations to grippingly engage the axially inner side of the reinforced edge.

5 Claims, 5 Drawing Figures

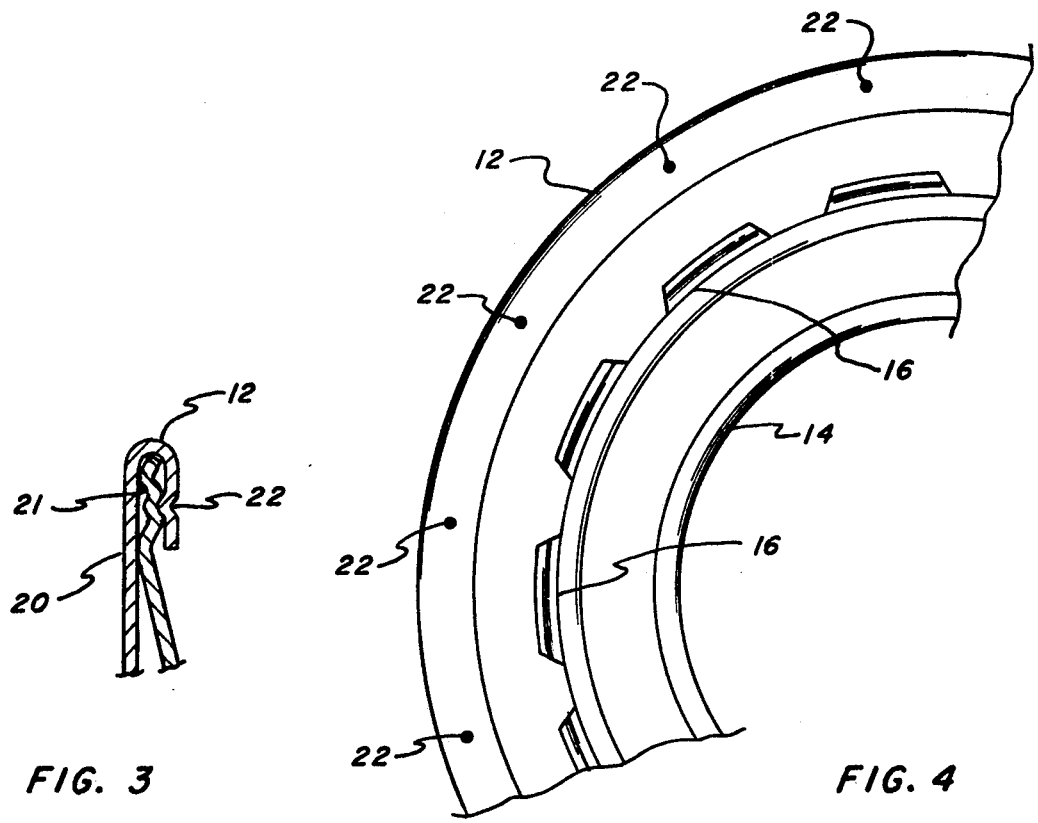
FIG. 3
FIG. 4
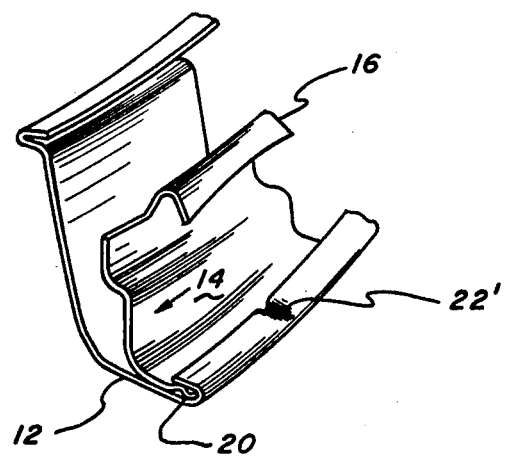
FIG. 5

VEHICLE WHEEL TRIM RING ASSEMBLY

BACKGROUND OF THE INVENTION

This invention relates to vehicle wheel trim rings and retaining rings assembled therewith and having means for engaging wheel tire rims.

Vehicle wheel trim rings are known in the art and have comprised an ornamental wheel trim member having an annular rolled edge tightly crimped, clinched, or rolled around an annular edge of a retaining ring. One common technique of manufacture is to roll a narrow strip of material into the desired cross-sectional shape, form cut lengths into hoops, and then weld the ends of the hoops together. The ornamental trim ring member may be similarly formed or may be stamped from a suitable blank of the desired material. In order to provide a rigid assembly wherein relative slippage between the two members is avoided it has been necessary to provide either oppositely disposed annular bands about the outer edge of the retaining ring or to provide a folded over hemmed edge at the outer edge of the retaining ring prior to the clinching or rolling operation. The annular bands, or the folded over or hemmed edge have been believed to be necessary in order to provide a suitably secure clinch or crimp while avoiding any visually noticable affects at the outer surface of the ornamental trim ring member.

Since these types of multi-piece trim rings are relatively expensive, it has been the constant objective in the prior art to utilize a minimum amount of raw material and to minimize the amount of unused or scrap material. It is therefore a primary object of the present invention to provide an improved vehicle wheel trim assembly in which material costs and scrap are reduced by avoiding the folded over or hemmed portion which heretofore has been believed necessary to provide a suitably rigid and secure assembly.

SUMMARY OF THE INVENTION

Briefly, a wheel cover assembly comprising a retaining ring member having a circle of radially resilient teeth at its axially inward end and a radially directed and axially facing margin at its other end, and an ornamental trim ring member having an outer annular axially facing margin is provided. The outer annular margin of the retaining ring is provided with a reinforced edge at the outer portion thereof and formed from a single thickness of the material of the outer margin. The outer portion of the margin of the trim ring member is rolled and clinched about the reinforced edge and a plurality of circumferentially disposed axially outwardly directed indentations are provided in the rolled over portion to grippingly engage the reinforced edge, thereby to secure the assembly.

BRIEF DESCRIPTION OF THE DRAWING

The advantages of this invention will become more readily appreciated as the same becomes completely understood by reference to the following detailed description when taken in conjunction with the accompanying drawing wherein:

FIG. 3 is an enlarged view of the encircled portion of FIG. 2 illustrating the details of the assembly between the elements of the wheel trim ring assembly of FIGS. 1 and 2;

FIG. 4 is a partial backside view of FIG. 1; and

FIG. 5 is a partial and sectional view of the trim ring assembly illustrating particularly an alternative technique for providing a gripping engagement indentation.

DETAILED DESCRIPTION

Figure 1:
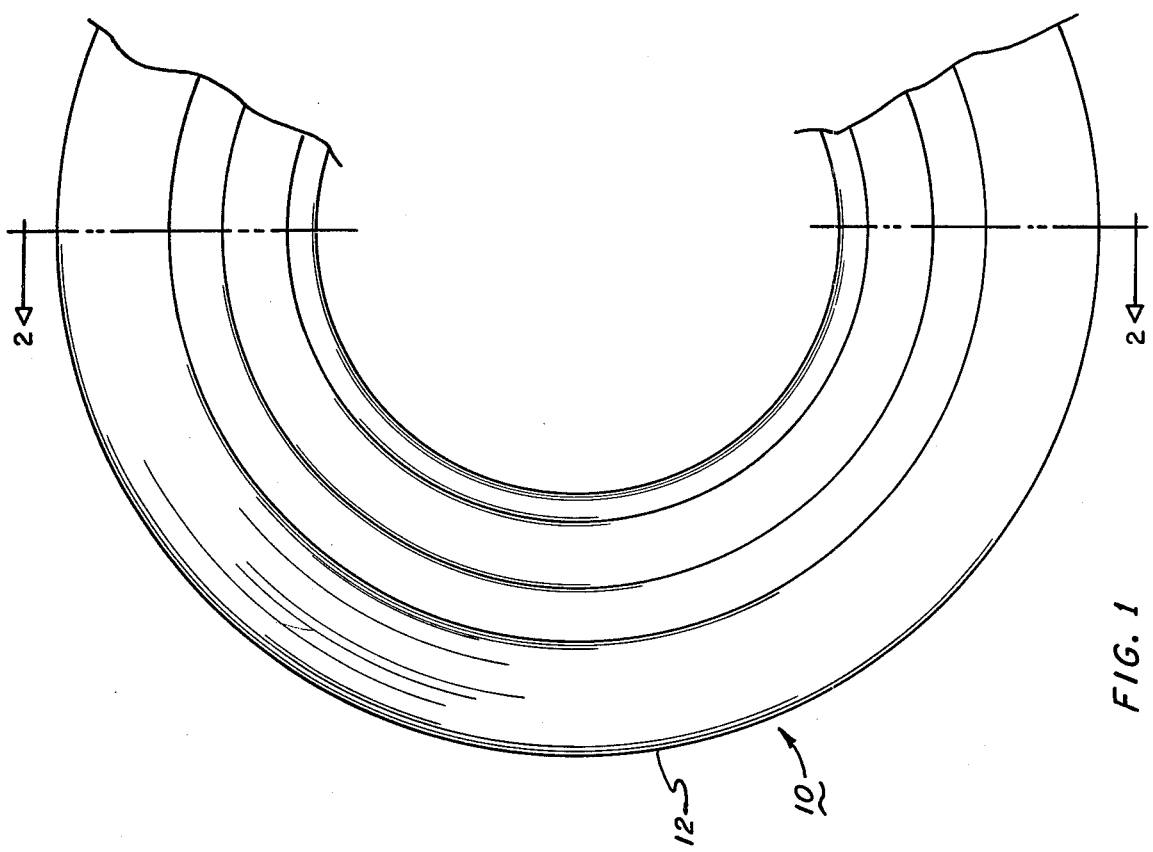
FIG. 1 is a partial front elevation view of a vehicle wheel trim ring assembly constructed in accordance with this invention.

Referring now in detail to the drawing, numeral 10 designates generally a wheel trim ring assembly in accordance with the present invention. FIG. 1 provides a front elevation view illustrating the normally visible ornamental trim ring member 12 which overlies a retaining ring member 14 (not shown in FIG. 1) in concealing relationship therewith. The outside or external surface of trim ring member 12 may be provided with a bright or other decorative finish by techniques well developed in the art. For example, trim ring member 12 may be provided with chrome plating or otherwise buffed and polished to a high luster surface. As will be discussed more fully hereinafter, it is this polished surface requirement that necessitates particular care and consideration in joining the trim ring member to the retaining ring structure.

Figure 2:
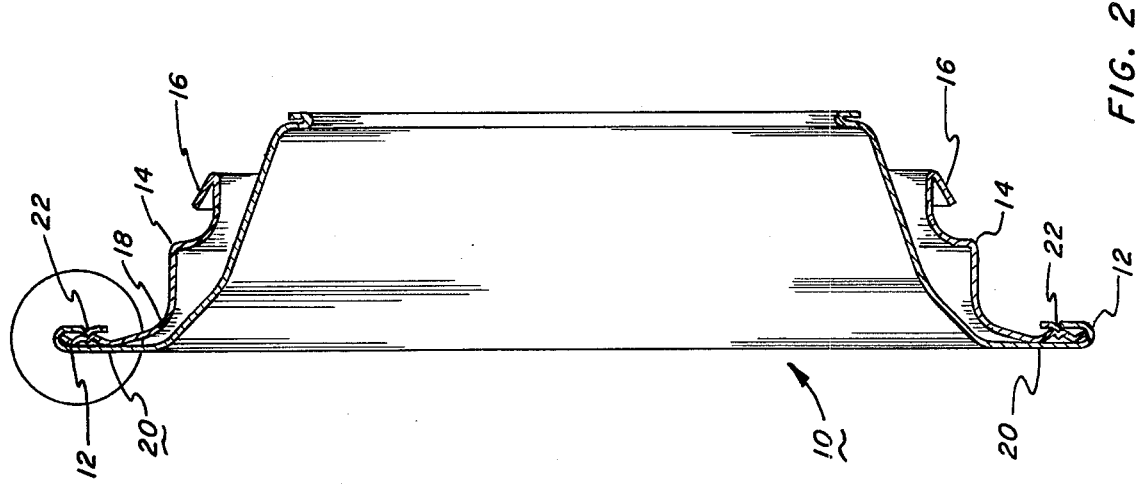
FIG. 2 is sectional elevation view taken along the line 2—2 of FIG. 1.

Referring now to FIG. 2, there is shown a sectional elevation view taken along the line 2—2 of FIG. 1. The retaining ring member is shown generally at 14 and includes a circle of retaining fingers 16 at the axially inner end thereof. Retaining fingers 16 may take any one of several forms such as one of the types shown in the U.S. patents to Lyon U.S. Pat. No. 2,624,634 or Dagobert U.S. Pat. No. 3,317,249. The other end of retaining ring member 14 includes a radially directed and axially facing margin or flange 18 having a reinforced outer edge section shown generally at 20. The radially outer margin of trim ring member 12 is folded or rolled over the reinforced edge 20 of retaining ring member 14. Finally, during the clinching operation, a series of circumferentially spaced indentations 22 are provided on the folded over portion of trim ring member 12 so as to prevent relative rotation between members 12 and 14 and for the purpose of quieting any squeaking or noise that might otherwise result.

Referring now to FIG. 3 there is shown an enlarged view of the encircled portion of FIG. 2. It can be seen by reference to FIG. 3 that the reinforced edge 20 of retaining ring member 14 may take the form of a reverse bent bead 21 or any other suitable structure formed from, and in the plane of, axially facing flange 18 and formed from a single thickness of the material thereof. FIG. 4 provides a partial backside view of wheel cover assembly 10 of FIG. 1 and illustrates particularly the circumferentially spaced indentations 22. In currently preferred practice, twenty-four indentations are symmetrically provided along the outer annular portion of trim ring member 12. It will be appreciated by those skilled in the art that such indentations are readily provided by providing suitable complementary structure on the dies which are used in the clinching operation of wheel assembly 10. It will also be appreciated by those skilled in the art that the actual number of, as well as the geometric configuration of, indentations 22 may vary to suit a given application. For example, indentations 22 may take the form of a center punch type or point stakings; or radially directed chiseled lines or line stakings as exemplified by indentation 22' of FIG. 5.

Line staked indentation 22' of FIG. 5 has the advantage that the reinforced edge 20 is thereby worked outwardly into biting engagement with the turned edge of trim member 12. That is, during the line staking operation, the reinforced edge tends to creep solely radially outwardly so that its sharp or raw edge bites into trim member 12. Accordingly, this alternative embodiment provides an even greater resistance against relative rotation between the two members of the wheel cover assembly. Further, by providing a line stake rather than a point stake, the dimensional requirements of the clinching die are relaxed somewhat as only a portion of the line staking need contact bead 21 to ensure the radially outward biting engagement.

It should now be appreciated that the wheel trim ring assembly 10, in accordance with the principles of the present invention, eliminates the retention bands or folded over hemmed structure characteristic of the prior art. It will also be appreciated that by eliminating such structure the overall weight and material requirements of the wheel trim ring assembly are significantly reduced. In one constructed embodiment, the materials savings was on the order of 4 to 5 percent in a "full" cover application (i.e., in a cover which completely covers the wheel rim); and it is anticipated that savings on the order of 4 to 10 percent should readily be attained, particularly with "three-quarter" covers. Further, it has been found that the reinforced structure in combination with the indentation provides a secure attachment therebetween while preventing relative rotation between the two members. More importantly, the clinching operation is effected without marring or materially visually affecting the outer surface of trim ring member 12 notwithstanding the utilization of but a single-thickness reinforced structure.

It should also be appreciated that the present invention substantially simplifies the die tooling requirements. That is, since the prior art hemmed edge is eliminated in accordance with the present invention, the dies handle less metal, are called upon to do less work and require less overall tooling. Accordingly, the maintenance requirements of the dies are correspondingly reduced. Further, since extra passes are required to provide the hem during the retaining ring forming process of the prior art, the retaining ring forming process of the present invention is also advantageously and greatly simplified.

What has been taught, then, is a vehicle wheel trim ring assembly facilitating, notably, minimum material requirements and minimum scrap. The form of the invention illustrated and described herein is but a preferred embodiment of these teachings. It is shown as an illustration of the inventive concept, however, rather than by way of limitation, and it is pointed out that various modifications and alterations may be indulged in within the scope of the appended claims.

What is claimed is:

1. A wheel cover assembly comprising a retaining ring member having a circle of radially resilient teeth at one end thereof and an initially radially directed and axially facing margin at the other end thereof and terminating in a sharp terminal edge, and a trim ring member having an outer annular and axially facing margin;

wherein said margin of said retaining ring is provided with a reinforced portion formed from the initial plane of said margin of said retaining ring member and of a single thickness of the material of said margin of said retaining ring member, wherein the sharp terminal edge of said margin is spaced and extends radially outwardly from said reinforced portion; and wherein said annular margin of said trim ring member includes a portion which is folded over the axially inwardly and outwardly facing sides of said terminal edge and clinched about said reinforced portion of said retaining ring member, and wherein said folded over portion is provided with a series of circumferentially spaced indentations on the axially inwardly facing side of said folded over portion which indentations project axially outwardly to grippingly engage the axially inwardly facing side of said reinforced portion of said retaining ring member.

2. The wheel cover assembly according to claim 1, wherein said reinforced portion is a bead stamped from the plane of said margin of said retaining ring member.

3. The wheel cover assembly according to claim 2, wherein said indentations are generally radially outwardly directed line stakings whereby the terminal edge of said reinforced portion bitingly engages a radially inner surface of said folded over portion of said annular margin of said trim ring member.

4. A method for producing a wheel cover assembly comprising a retaining ring member having a circle of radially resilient teeth at one end thereof and an initially radially directed and axially facing margin at the other end thereof and terminating in a sharp terminal edge, and a trim ring member having an outer annular and axially facing margin, said method comprising the steps of:

forming a reinforced portion from the initial plane of said margin of said retaining ring and of a single thickness of the material of said margin of said retaining ring member wherein the sharp terminal edge of said margin projects generally radially outwardly and is spaced radially outwardly of said reinforced portion;

folding a portion of said annular margin of said trim ring member over said terminal edge and said reinforced portion of said retaining ring member; and indenting the folded portion of said annular margin axially outwardly and into gripping engagement with the axially inwardly facing side of said reinforced portion of said margin of said retaining ring.

5. The method according to claim 4, wherein said indenting step includes the step of providing a series of circumferentially spaced and generally radially directed line stakes along said folded portion of said annular margin.

* * * * *